(12) United States Patent
Wang (10) Patent No.: US 11,280,957 B1
(45) Date of Patent: Mar. 22, 2022

(54) GLASS LIGHT GUIDE PLATE

(71) Applicant: Tiejun Wang, Lin'an (CN)

(72) Inventor: Tiejun Wang, Lin'an (CN)

( * ) Notice: Subject to any disclaimer, the term of this patent is extended or adjusted under 35 U.S.C. 154(b) by 0 days.

(21) Appl. No.: 17/089,945

(22) Filed: Nov. 5, 2020

(51) Int. Cl.
*F21V 8/00* (2006.01)

(52) U.S. Cl.
CPC ......... *G02B 6/0073* (2013.01); *G02B 6/0025* (2013.01); *G02B 6/0055* (2013.01)

(58) Field of Classification Search
None
See application file for complete search history.

(56) References Cited

U.S. PATENT DOCUMENTS

| | | | | |
|---|---|---|---|---|
| 8,301,024 | B2 * | 10/2012 | Mather | G03B 15/05 396/176 |
| 8,641,257 | B2 * | 2/2014 | Richardson | G09F 9/30 362/615 |
| 9,291,320 | B2 * | 3/2016 | Durkee | G02B 6/0035 |
| 9,389,367 | B2 * | 7/2016 | Yuan | G02B 6/0031 |
| 2008/0266896 | A1 * | 10/2008 | Chang | G02B 6/0043 362/606 |
| 2010/0085773 | A1 * | 4/2010 | Richardson | G02B 6/0055 362/615 |
| 2010/0142223 | A1 * | 6/2010 | Suckling | G02B 6/0038 362/615 |
| 2011/0090422 | A1 * | 4/2011 | Hamada | G02B 6/0091 349/62 |
| 2011/0149594 | A1 * | 6/2011 | Terajima | G02B 6/0021 362/606 |
| 2015/0036313 | A1 * | 2/2015 | Ookubo | G02B 6/0061 362/19 |
| 2015/0277024 | A1 * | 10/2015 | Hsu | G02B 6/0036 362/612 |
| 2017/0031080 | A1 * | 2/2017 | Speer | G02B 6/0036 |
| 2018/0164486 | A1 * | 6/2018 | Park | G02B 6/0025 |
| 2018/0259701 | A1 * | 9/2018 | Yuki | G02B 6/0055 |

FOREIGN PATENT DOCUMENTS

JP 2009199971 A * 9/2009

* cited by examiner

*Primary Examiner* — Britt D Hanley
(74) *Attorney, Agent, or Firm* — Daniel M. Cohn; Howard M. Cohn (57) ABSTRACT

A glass light guide plate body has a light incident surface, a light reflecting surface and a light emitting surface. The light incident surface is adapted to direct light from an LED strip disposed about a perimeter surface of the light incident surface into the glass light guide plate body. A light reflective surface extending across the upper surface of the glass light guide plate body reflects the light directed upwards through the glass light guide plate body downwards back through the glass light guide plate body towards a light-emitting surface. The light reflective surface is provided with a reflective layer.

14 Claims, 6 Drawing Sheets

GLASS LIGHT GUIDE PLATE

TECHNICAL FIELD

The present invention relates to the field of display technologies, and in particular, to a glass light guide plate and a method of fabricating the same.

BACKGROUND OF THE INVENTION

In the display field, the role of the glass light guide plate disposed in a display panel is to guide the scattering direction of a light being shone on the glass light guide plate, to improve the brightness of the display panel, and to ensure the brightness uniformity of the display panel. It is desirable to prevent the light being shone on the glass light guide plate from being continuously reflected inside the glass light guide plate.

SUMMARY OF THE INVENTION

According to the present invention, there is disclosed a glass light guide plate body having a light incident surface, a light reflecting surface and a light emitting surface. The light incident surface is adapted to direct light from an LED strip disposed about a perimeter surface of the light incident surface into the glass light guide plate body. A light reflective surface extending across the upper surface of the glass light guide plate body to reflect the light directed upwards through the glass light guide plate body downwards back through the glass light guide plate body towards a light-emitting surface. The light reflective surface is provided with a reflective layer.

Further, according to the present invention, a lamp housing for a glass light guide plate comprises an upstanding collar which both protects the glass light guide plate and reflects light and transmits light from a light exit surface of the glass light guide plate to the light reflecting surface of the light guide plate. The light guide plate has a light incident surface adapted to direct light from an LED strip disposed between a perimeter surface of the light incident surface and the upstanding collar. A diffuser plate is mounted on the lamp housing below the glass light guide plate and extends across an opening through the upstanding collar. The light exit surface of the glass light guide plate is disposed against the diffuser plate. A back-cover plate is secured to the lamp housing.

BRIEF DESCRIPTION OF THE DRAWINGS

The structure, operation, and advantages of the present invention will become further apparent upon consideration of the following description taken in conjunction with the accompanying figures (Figs.). The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

In the drawings accompanying the description that follows, both reference numerals and legends (labels, text descriptions) may be used to identify elements. If legends are provided, they are intended merely as an aid to the reader, and should not in any way be interpreted as limiting.

DETAILED DESCRIPTION OF THE PREFERRED EMBODIMENTS

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader and should not in any way be interpreted as limiting.

The present invention is directed to overcoming the limitations of prior art diffusion glass light guide plates which caused poor light guiding. The glass light guide plates of the present invention may employ regular or irregular shaped protuberances according to the light energy source, the particular configuration of the light dot, and the ability to transmit more uniform light. The glass light guide plate of the present invention is constructed to guide light while saving energy. The glass light guide plate of the present invention can be fabricated by using a mold, which simplifies the production process and has high production efficiency.

Figure 2:
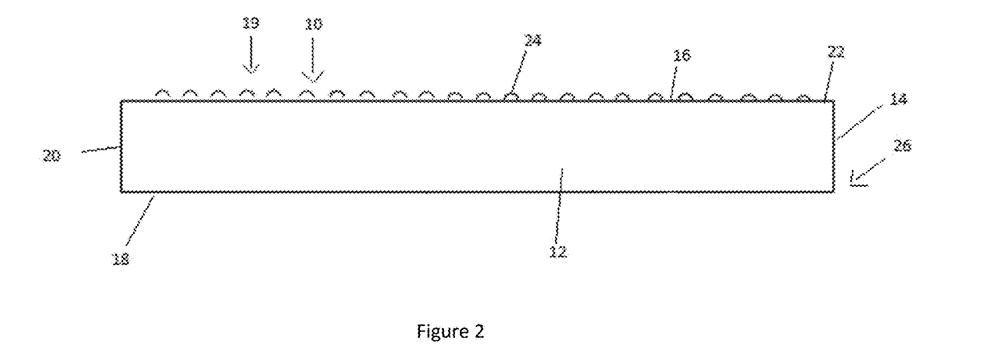
FIG. 2 is a structural side view of a first embodiment of a glass light guide in accordance with the present invention.
Figure 9:
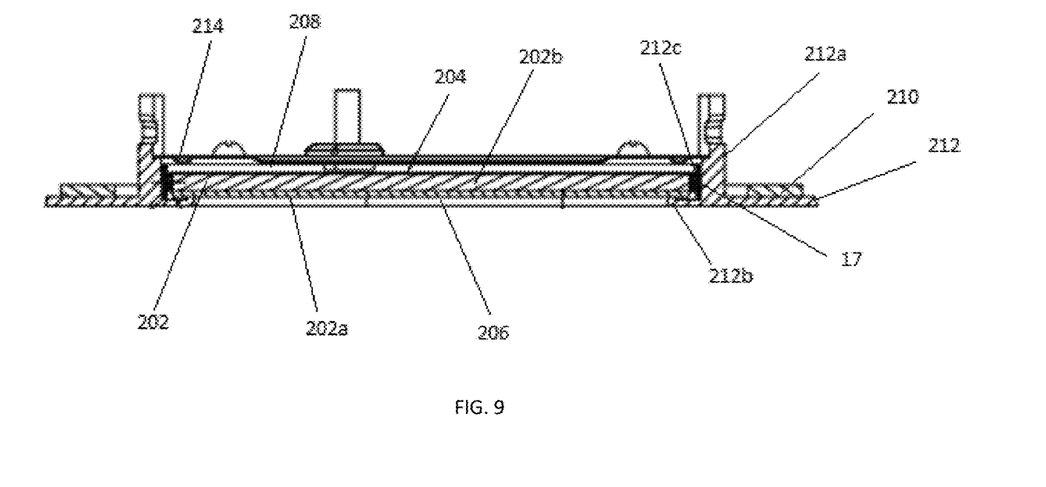
FIG. 9 is a cross-sectional side view of an assembled lamp with a glass light guide plate, in accordance with the present invention.

The glass light guide plate of the present invention is characterized in that the glass light guide plate 10, as shown in FIG. 2, comprises a glass light guide plate body 12, a light incident surface 14, a light reflecting surface 16 and a light emitting surface 18. The light incident surface 14 directs light from an LED strip 17 having a series of LEDs mounted to the strip and wrapped around the circumference of the glass light guide plate body as shown in FIG. 9. The light from the LEDs is directed towards the LEDs on the opposite side of the glass light guide plate body 12 from which they are placed. The light in the glass light guide plate body 12 is reflected upwards towards a light reflective surface 16 extending across the upper surface of the glass light guide plate body 12 and intersecting the upper edge of the light incident surface 14. The reflected upwards towards a light reflective surface 16 is reflected downwards back through the glass light guide plate body 12 and through a light-emitting surface 18 opposite to the light-reflecting surface 16. The side surface 20 forming the light incident surface 14 can be formed with a reflective surface so that the incident light from the LEDs shining through the light incident surface 14 is reflected back into the light body 12 and upwards towards the reflecting surface 16.

The light-reflecting surface 16 is provided with a reflective layer 22. The reflective layer 22 includes a plurality of protruding elements 24 of the essentially the same size. The first embodiment, as shown in FIG. 2, incorporates protruding elements 24 having a convex shape and which protrude uniformly from an outer side surface 22 of the reflective surface 16. When the source light 26 from the LEDs 17 passing through the light incident surface 14 reflects upward through the light reflective surface 16, a plurality of the convex elements 24 diffusely reflect the reflected source light back to the light emitting surface 18 whereby soft and uniform ambient light is transmitted from the light exit surface 18.

The glass light guide plate body 12 can be of a circular shape. However, it is within the terms of the invention to form the glass light guide plate body 12 of any desired shape such as rectangular or square.

Preferably, the reflective surface 16 is selected from a group of surfaces including a planar surface, a curved surface and an irregular surface. In FIG. 2 of the first embodiment, the reflective surface 16 is a planar surface. The second and third embodiments described hereinafter and shown in FIGS. 3 and 4, respectively, show a curved surface and an irregular surface.

As shown in FIG. 2, the shape of the light-emitting surface 18 is the same as the shape of the light-reflecting surface 16.

While the protruding elements 24 on the light reflecting surface 16, as shown in FIG. 2, have a convex shape, it is within the terms of the present invention that the protruding elements 24 be constructed is in the form of a pellet, a ring, a polygon or an irregular shape.

As shown in the Figures, the reflecting surface 16 is provided with a large number of protruding elements 24 projecting outward from the glass light guide plate 12. The glass light guide plate 12 reflects the light passing through the light incident surface 14 and onto the reflecting surface 16 covered with a plurality of protruding elements 24 back through the glass light guide plate body 12 toward the light emitting surface 18 from which the light is emitted.

The glass light guide structure 10 causes a scattering of light directed into the glass light guide plate or body 12 from a plurality of LEDs disposed about a perimeter surface of the glass light guide plate. The glass light guide plate or body 12 has a cylindrical shape with the light incident surface forming a circular perimeter surface. While the light from the LEDs would typically be directed downward and out of the glass light guide plate, as in a back-lit LED panel, the light from the LEDs of the present invention are directed inward of the glass light guide plate body 12, known as an edge-lit panel, and then back out of the bottom light emitting surface 18 after being reflected from the plurality of raised protruding elements 24 on the light reflecting surface 16. This effect of scattering of light from the glass light guide surface 16, results in less than the all the light entering light incident surface 14 from being completely transmitted to and ultimately reflected from the light-emitting surface 18.

Figure 1:
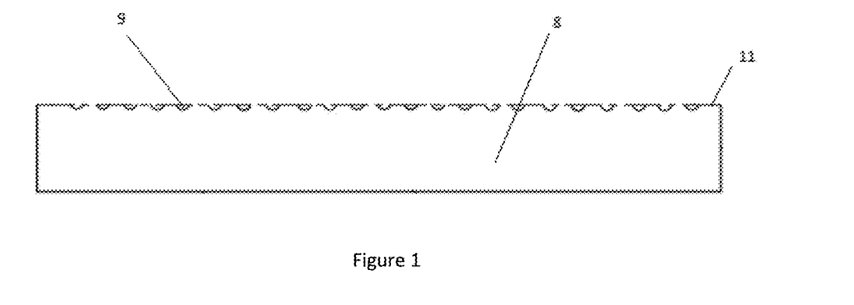
FIG. 1 is a schematic structural side view of a glass light guide plate.

It should be understood that the result of the scattering of light from a light source, such as a plurality of LEDs 17 wound around the circumference of the glass light guide plate body, entering the light incident surface 14 is a loss of light energy. In additional, the plurality of protuberances 9 directed inward, as shown in FIG. 1, need to be carefully made, usually by hand. The manufacture of the glass light guide plate 10 is greatly affected by human factors, and because there is often a phenomenon of alternating light and dark, the production efficiency is low.

The present invention is further illustrated by the following examples, which are not intended to limit the invention.

Referring to FIG. 2, a glass light guide plate 10 includes a glass light guide plate body 12, a light incident surface 14, a light reflecting surface 16 and a light exit surface 18. The glass light guide plate 10 includes a light incident surface 14 which sends light from a strip of LEDs 17 wound around the glass light guide plate 10 to the reflecting surface 16. The reflecting surface 16 is disposed opposite to the light exit surface 18. The light from a strip of LEDs 17 entering the light incident surface 14 is directed toward the LEDs on the opposite side of the glass light guide plate body 12. The light directed into the glass light guide plate body 12 is directed upwards to the reflecting surface 16. The reflective surface 16 is provided with a reflective layer 19 on its outer side surface. The reflective layer 19 comprises a plurality of identical sized, protuberances 24. The uniform protruding elements 24 are disposed on and project outward from the outer side surface of the reflective surface 16. When the source light from a strip of LEDs wound around the circumference of the glass light guide plate 10 passes through the light incident surface 14 and is reflected onto the reflective surface 16, the plurality of protruding elements 24 diffusely reflect the source light back towards the light emitting surface 18 to obtain soft and uniform ambient light. The ambient light is transmitted from the light exit surface 18. This can be distinguished from the glass light guide plate 8, as shown in FIG. 1, wherein the comparable protruding elements 9 project inward into the reflective surface 11 of glass light guide plate 8.

As shown in FIG. 2, the plurality of protruding elements 24 are convex shaped elements 24 which can more effectively diffusely reflect the source light as soft and uniform ambient light which is transmitted from the light exit surface 18. Preferably, the reflective surface 16 is a flat surface as shown in FIG. 2.

Figure 3:
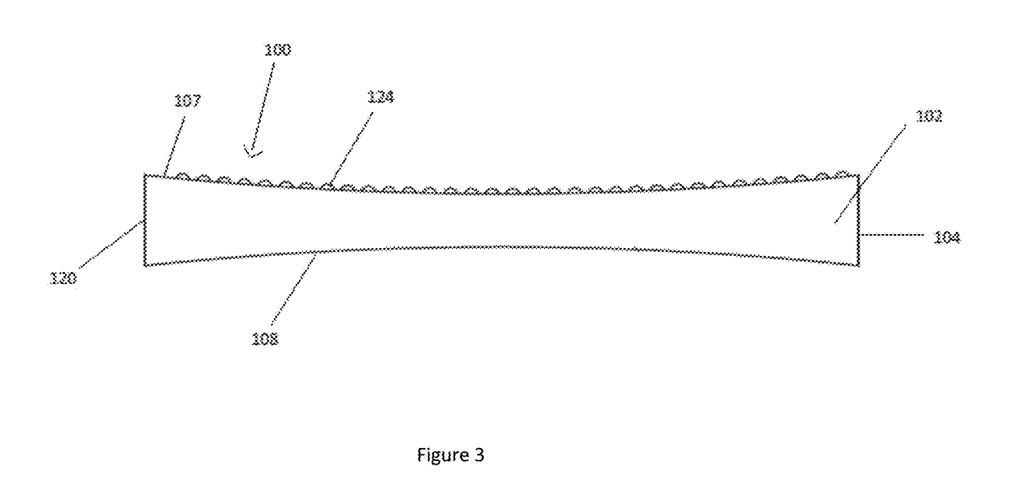
FIG. 3 is a second embodiment of a glass light guide plate, in accordance with the present invention.

In FIG. 3, there is illustrated another embodiment of the present invention wherein a glass light guide plate 100 includes a glass light guide plate body 102, a light incident surface 104 (compare light incident surface 14 of FIG. 2), a light reflecting surface 106 and a light exit surface 108. The glass light guide plate 100 includes a light incident surface 104 which sends light from a strip of LEDs 17 wound around the glass light guide plate 100 to the reflecting surface 106. The reflecting surface 106 is disposed opposite to the light exit surface 108. The reflecting surface 106 is provided with a reflective layer 107 on its outer side surface. The reflective layer 107 comprises a plurality of protruding members 124, typically of identical size and shape. The uniform protruding elements 124 are disposed on and project outward from the outer side surface of the reflective surface 106. When the source light passing through the light incident surface 104 enters the reflective surface 106, the plurality of protruding elements 124 diffusely reflect the source light back towards the light emitting surface 108 to obtain soft and uniform ambient light. The ambient light is transmitted from the light exit surface 108. As shown in FIG. 2, the plurality of protruding elements 24 are convex shaped elements 24 which can more effectively diffusely reflect the source light as soft and uniform ambient light which is transmitted from the light exit surface 108. Preferably, the reflective surface 106 is a curved surface with a concave shape as shown in FIG. 3. The light exit surface 108 preferably has a curved surface with a concave shape which corresponds to and is the same shape as the curved surface of reflective surface 106. That is, the curved concave shape of reflective surface 106 is toward the opposite light exit surface 108 and the curved concave shape of the light exit surface 108 curved upward toward the opposite reflective surface 106.

It is also within the terms of the present invention that the reflective surface of the glass light guide plate has an irregular surface. In that case, the light exit surface would have an irregular surface having a corresponding shape to that of the reflective surface.

Figure 4:
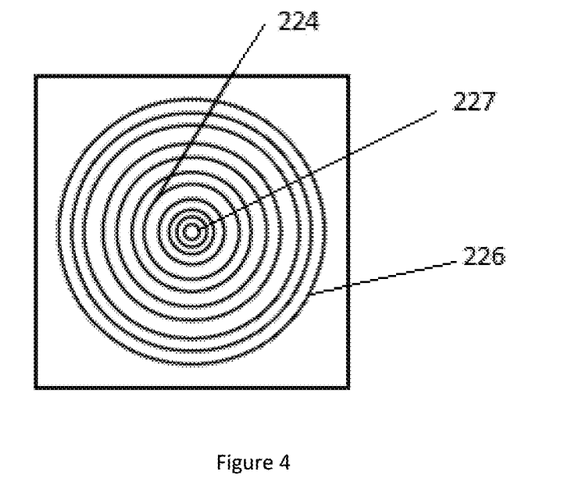
FIG. 4 is a schematic of a first embodiment of the reflecting surface of a glass light guide plate, in accordance with the present invention.
Figure 5:
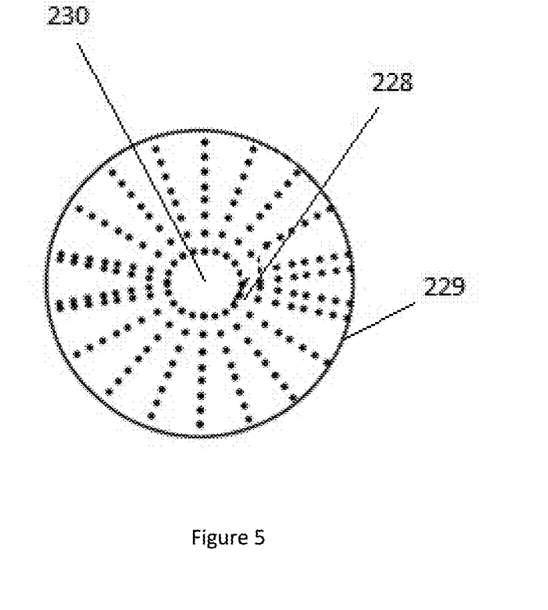
FIG. 5 is a schematic view of a second embodiment of the reflecting surface of a glass light guide plate, in accordance with the present invention.
Figure 6:
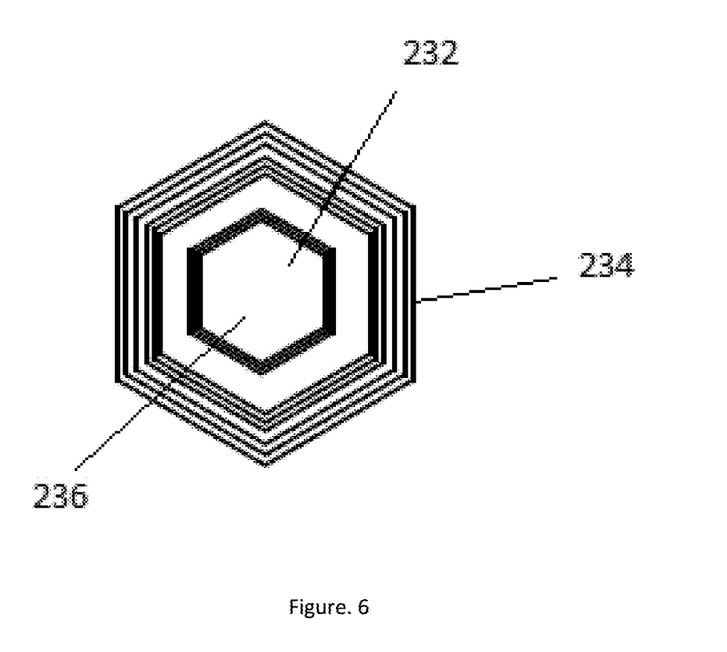
FIG. 6 is a schematic view showing the structure of a third embodiment of the reflecting surface of a glass light guide plate, in accordance with the present invention.

Preferably, the projections or elements 224, 228 and 232 may be granulated as shown in FIGS. 4, 5 and 6. In FIG. 4, the protruding element 224 has an annular shape with an outer circumference 226 that decreases as it moves towards the center 227 of the projection. In FIG. 5, the protruding elements 228 have a circular base 229 and a smaller circular top 230. In FIG. 6, the protruding elements 232 has a polygonal shape where the perimeter of the outer polygon 234 forming the base is larger than the top polygon 236 forming the upper end of the protruding element 232.

Another aspect of the present invention relates to a method for fabricating a glass light guide plate 10 or 100 as described herein before. The method fabricating begins with fabricating a glass light guide plate mold. The glass light guide plate mold is provided with a light entrance mold surface, a reflective mold surface and a light exit mold surface. A convex mold surface is uniformly convexly provided with a convex hole, the light entrance mold surface and the reflective mold surface. The light emitting surface and the convex hole constitute a hollow structure inside.

The raw material to be dried are injected into the glass light guide plate mold by an injection molding machine and heated and molded. Then the light mold surface, the reflective mold surface, the light exit mold surface, and the convex holes are formed to form the raw material into the light surface 14, the reflective surface 16, the light emitting surface 18 and the protruding elements 24 of the reflective surface 16.

Figure 7:
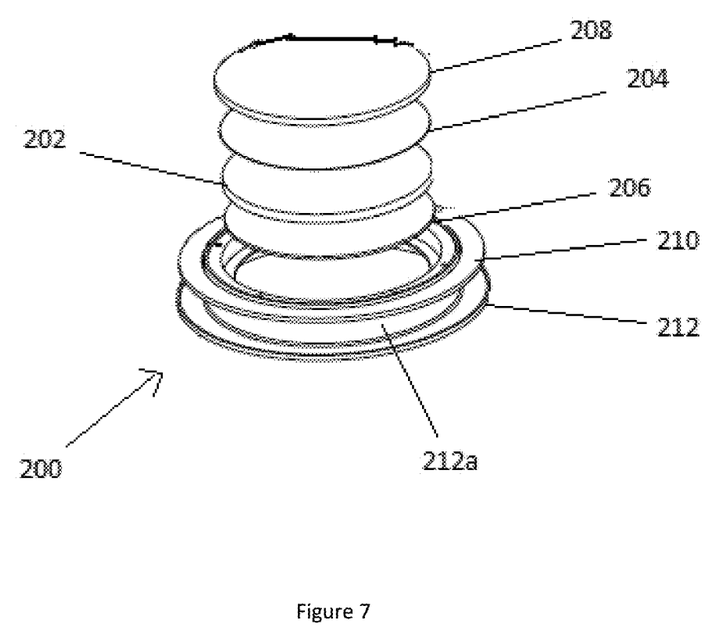
FIG. 7 is a schematic structural view of a glass light guide plate assembled into a lamp, in accordance with the present invention.

The glass light guide plate of the present invention may be installed into fixture 200 as shown in FIG. 7. The glass light guide plate 202 (compare glass light guide plates 10 and 100) forms an upper guide plate disposed between a reflective paper pad 204 of Ethylene-vinyl acetate (EVA) and a diffusion plate 206. A washer or shim 208 of EVA is placed against the reflective paper pad 204. A gasket 210 constructed of EVA is disposed between the diffusion plate 206 and a lamp housing 212. The lamp housing 212 has a collar 212a which both protects the glass light guide plate 202 and is also more effective for reflecting light sufficiently and transmitting light from the light exit surface of the glass light guide plate.

Figure 8:
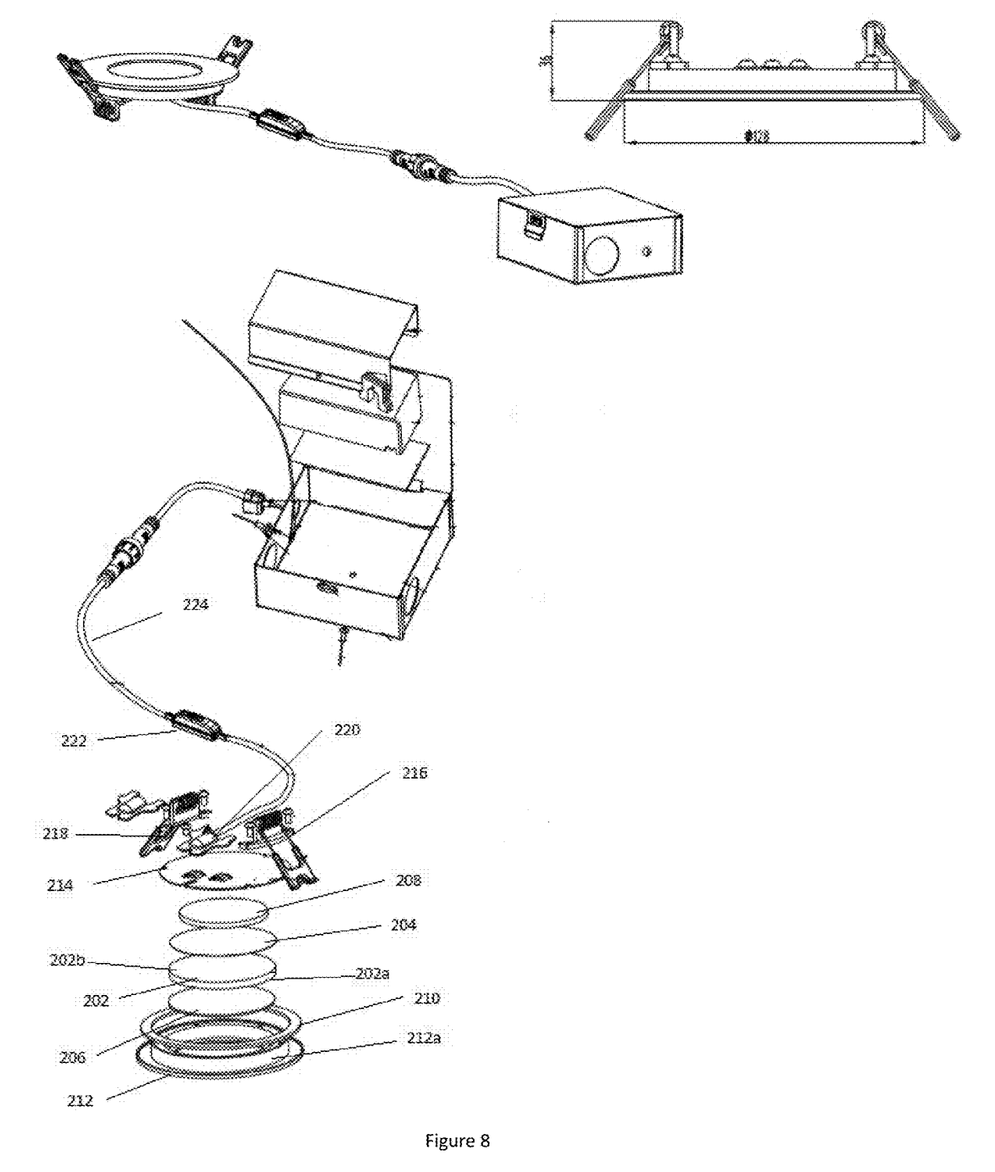
FIG. 8 is a schematic structural view of a glass light guide plate assembled into a lamp, in accordance with the present invention.

Referring to FIG. 8, there is illustrated an exploded view of the glass light guide plate 202 mounted in a lamp housing 212. As shown in FIG. 7, the lamp housing 212 has an upstanding collar 212a which both protects the glass light guide plate 202 and is effective for reflecting light and transmitting light from the light exit surface of the glass light guide plate. An EVA gasket 210 is disposed around the collar 212a. The diffuser plate 206 rests on a shoulder 212b which is formed on the lamp housing 212 and extends into an opening 212c which extends through the collar 212a. The light exit surface 202a of the glass light guide plate 202 is disposed against the diffuser plate 206. A reflective paper pad 204 of EVA material is disposed against the light reflecting surface 202b of the glass light guide plate 202 and acts to reflect the light down to the light reflecting surface 202b. A shim 208 of EVA material is disposed on the reflective paper pad 204 and has a back-cover plate 214 resting thereon. Two springs 216 and 218 secure the cover plate 214 to the lamp housing 212. A line pressing piece 220 mounts to the cover plate 214 and is controlled by a switch 222 in a power cable 224.

Referring to FIG. 9, there is shown a cross section of the glass light guide plate 202 mounted in a lamp housing 212. The lamp housing 212 has an upstanding collar 212a with an EVA gasket 210 disposed around the collar 212a. The diffuser plate 206 rests on a shoulder 212b which is formed on the lamp housing 212 and extends into an opening 212c which extends through the collar 212a. A strip 17 of LEDs is wound around the inner facing surface of the collar 212a. The light exit surface 202a of the glass light guide plate 202 is disposed against the diffuser plate 206 which acts to diffuse the light being directed out of the bottom of the lamp housing 212. A reflective paper pad 204 of EVA material is disposed against the light reflecting surface 202b of the glass light guide plate 202 and acts to reflect the light down to the light reflecting surface 202b. The glass light guide plate 202 has a plurality of protruding elements formed on the light reflecting surface 202b, as discussed herein before. A shim 208 of EVA material is disposed on the reflective paper pad 204 and has a back cover plate 214 resting thereon. Three wires attached to the strip 17 of LEDs extend through the back cover plate 214 and are attached to the cable 224.

The present invention has been described in detail above with reference to the embodiments of the drawings, and various modifications of the present invention can be made by those skilled in the art in light of the above description. Any modification within the spirit and principle of the present invention, made, equivalent substitutions, improvements, etc., should be included within the scope of the present invention. Thus, certain details of the embodiments should not be construed as limiting the present invention, the present invention will define the scope of the claims appended as the scope of the present invention.

The invention claimed is:
1. A lamp housing for a glass light guide plate, comprising:
the lamp housing having an upstanding cylindrical collar with an opening therethrough;
a shoulder formed on an inner surface of the lamp housing and extending into the opening through the collar;
a diffuser plate mounted on the shoulder formed on the inner surface of the lamp housing and overlying the opening through the cylindrical collar;
a glass light guide plate having a light incident surface extending around the periphery of the glass light guide plate, a light reflecting surface across an outer surface of the light guide plate, a light exit surface extending across an opposite surface of the light guide plate from the light reflecting surface;

the glass light guide plate being disposed within the opening through the upstanding collar whereby a light exit surface of the glass light guide plate is disposed against and in contact with the diffuser plate; a strip of LEDs wound around the light incidence surface of the glass light guide plate to direct light towards the LEDs on the opposite side of the glass light guide;

the light incident surface formed with a reflective surface layer so that incident light from the LEDs is reflected back into the glass light guide plate and upwards towards the light reflecting surface;

the upstanding cylindrical collar provided in the lamp housing to protect the glass light guide plate and for reflecting light from the light exit surface of the glass light guide plate and for transmitting soft and uniform ambient light from the light exit surface of the glass light guide plate;

a glass light guide plate supported on the diffuser plate within the upstanding collar for both protecting the glass light guide plate and for reflecting and transmitting light from the light exit surface of the glass light guide plate to the light reflecting surface of the light guide plate;

the glass light guide plate having a light incident surface adapted to direct light from the LED strip disposed between a perimeter surface of the light incident surface and the upstanding collar; and a back-cover plate secured to the lamp housing.

2. The glass light guide plate of claim 1 wherein:
the glass light guide plate body has a cylindrical shape with the light incident surface forming a circular perimeter surface.

3. The glass light guide plate of claim 1 wherein the reflective layer of the light-reflecting surface includes a plurality of protruding elements extending outward from the light-reflecting surface in a direction opposite that of the light emitting surface.

4. The glass light guide plate of claim 3 wherein that the protruding elements has a shape selected from the group consisting of a pellet, a ring, a polygon and an irregular shape.

5. The glass light guide plate of claim 4 wherein the protruding elements have an annular shape with an outer circumference that decreases as it moves towards the center of the protruding elements.

6. The glass light guide plate of claim 4 wherein the protruding elements have a circular base and a smaller circular top the center of the protruding elements.

7. The glass light guide plate of claim 3 wherein the reflective layer of the light-reflecting surface includes a plurality of protruding elements having a convex shape and which protrude uniformly from an outer side surface of the reflective surface.

8. The glass light guide plate of claim 7 wherein the shape of the light reflective surface can be selected from a group consisting of a planar surface, a curved surface and an irregular surface.

9. The glass light guide plate of claim 8 wherein the shape of the light reflective surface is the same the same shape as the light-emitting surface.

10. The A lamp housing of claim 9 wherein the light reflecting surface of the glass light guide has a reflective layer formed of a plurality of protruding elements extending outward from the light reflecting surface in a direction opposite that of the light emitting surface.

11. The A lamp housing of claim 10 wherein the light reflecting surface is selected are constructed from a group of surfaces including a planar surface, a curved surface and an irregular surface.

12. The lamp housing of claim 11 wherein the shape of the light reflecting surface is the same the same shape as the light emitting surface.

13. The lamp housing of claim 12 wherein:
a series of LEDs are mounted to the LED strip; and
the LED strip is wrapped around the circumference of the glass light guide plate body whereby the light from the LEDs is directed through glass light guide plate towards the LEDs on the opposite side of the glass light guide plate body.

14. The lamp housing of claim 12 wherein:
a reflective paper pad disposed against the light reflecting surface of the glass light guide plate to reflect the light down to the light reflecting surface; and
the back-cover plate rests upon the reflective paper pad and is secured to the lamp housing.

* * * * *